(12) United States Patent
Li

(10) Patent No.: US 10,356,003 B2
(45) Date of Patent: Jul. 16, 2019

(54) METHOD FOR TRUNCATING SERVICE PERIOD, NETWORK CONTROLLER, AND STATION

(71) Applicant: Huawei Technologies Co., Ltd., Shenzhen (CN)

(72) Inventor: Dejian Li, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 628 days.

(21) Appl. No.: 15/061,584

(22) Filed: Mar. 4, 2016

(65) Prior Publication Data

US 2016/0191409 A1   Jun. 30, 2016

Related U.S. Application Data

(63) Continuation of application No. PCT/CN2014/084735, filed on Aug. 19, 2014.

(30) Foreign Application Priority Data

Sep. 5, 2013 (CN) .......................... 2013 1 0400350

(51) Int. Cl.
*H04W 72/04* (2009.01)
*H04L 12/911* (2013.01)

(52) U.S. Cl.
CPC ......... *H04L 47/70* (2013.01); *H04W 72/0406* (2013.01)

(58) Field of Classification Search
CPC ............................. H04L 47/70; H04W 72/0406
(Continued)

(56) References Cited

U.S. PATENT DOCUMENTS 8,619,753 B1 * 12/2013 Liu ................... H04W 72/1257
370/322
2006/0227733 A1   10/2006 Frederiks et al.
(Continued)

FOREIGN PATENT DOCUMENTS

CN   101584133 A   11/2009
CN   101902268 A   12/2010
(Continued)

OTHER PUBLICATIONS

ECMA International, "High Rate 60 Ghz PHY, MAC and PALs," Standard ECMA-387, 2nd Edition, Dec. 2010, 302 pages.
(Continued)

*Primary Examiner* — Wing F Chan
*Assistant Examiner* — Leon Y Tseng
(74) *Attorney, Agent, or Firm* — Slater Matsil, LLP

(57) ABSTRACT

The present invention discloses a method for truncating a service period, a network controller, and a station. The method includes: determining allocation control information of an service period, where the allocation control information includes a truncation indication and a truncation type indication; and sending the allocation control information to a station, so that the station uses the service period to perform communication, and truncates the service period according to a truncation type indicated by the truncation type indication when the service period is surplus and the truncation indication indicates that the service period can be truncated. According to the method for truncating a service period, the network controller, and the station in embodiments of the present invention, interference to communication after the service period is truncated can be reduced.

16 Claims, 3 Drawing Sheets

(58) Field of Classification Search
USPC .......................................................... 709/226
See application file for complete search history.

(56) References Cited

U.S. PATENT DOCUMENTS

| | | |
|---|---|---|
| 2007/0248117 A1 | 10/2007 | Zuniga et al. |
| 2010/0002676 A1 | 1/2010 | Doi et al. |
| 2010/0103885 A1 | 4/2010 | Cordeiro et al. |
| 2010/0135268 A1* | 6/2010 | Seok .................. H04W 74/0816 370/338 |
| 2010/0254404 A1 | 10/2010 | Cordeiro et al. |
| 2010/0316032 A1* | 12/2010 | Chu ................... H04W 74/0825 370/338 |
| 2012/0093056 A1 | 4/2012 | Shin et al. |
| 2012/0327870 A1 | 12/2012 | Grandhi et al. |
| 2015/0282186 A1* | 10/2015 | Trainin ............. H04W 74/0816 370/336 |

FOREIGN PATENT DOCUMENTS

| | | |
|---|---|---|
| CN | 101958807 A | 1/2011 |
| JP | 2008533933 A | 8/2008 |
| KR | 20080069510 A | 7/2008 |
| KR | 20080087139 A | 9/2008 |
| KR | 20120038361 A | 4/2012 |
| WO | 2006102294 A2 | 9/2006 |
| WO | 2007081683 A2 | 7/2007 |

OTHER PUBLICATIONS

Torab, P., et al., "Wireless LANs," IEEE P802.11, Jun. 29, 2011, 43 pages.

IEEE, Draft Standard for Information Technology—Telecommunications and Information Exchange Between Systems—Local and Metropolitan Area Networks—Specific Requirements; Part 11: Wireless LAN Medium Access Control (MAC) and Physical Layer (PHY) Specifications; Amendment 5: Enhancements for Very High Throughput to Support Chinese Millimeter Wave Frequency Bands (60 GHz and 45 GHz); IEEE P802.11 aj(tm) /D2.0, May 2016, 312 pages. (Unapproved Draft).

IEEE Standard for Information Technology—Telecommunications and Information Exchange Between Systems Local and Metropolitan Area Networks—Specific Requirements; Part 11: Wireless LAN Medium Access Control (MAC) and Physical Layer (PHY) Specifications; Amendment 3: Enhancements for Very High Throughput in the 60 GHz Band; IEEE Std 802.11ad(tm), Oct. 2012, 628 pages.

IEEE Standard for Information Technology—Telecommunications and Information Exchange Between Systems—Local and Metropolitan Area Networks—Specific; Part 15.3: Wireless Medium Access Control (MAC) and Physical Layer (PHY) Specifications for High Rate Wireless Personal Area Networks (WPANs); Amendment 2: Millimeter-wave-based Alternative Physical Layer Extension, IEEE Std 802.15.3c-2009, 203 pages.

IEEE Standards Association, "IEEE Standard for information technology—Telecommunications and information exchange between systems, Local and metropolitan area networks—Specific requirements, Part 11: Wireless LAN Medium Access Control (MAC) and Physical Layer (PHY) Specifications, Amendment 3: Enhancements for Very High Throughput in the 60 GHz Band," IEEE Computer Society, IEEE 802.11ad, Dec. 28, 2012, pp. 149-151.

* cited by examiner

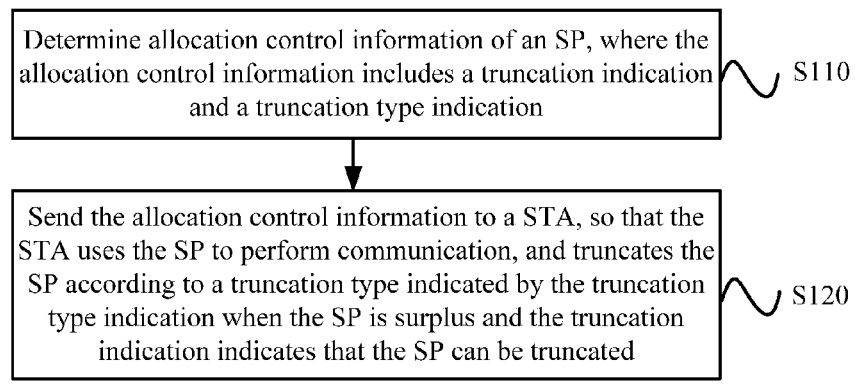
FIG. 1
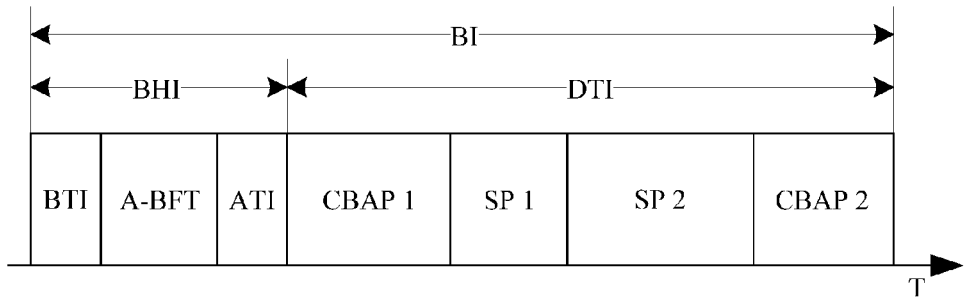
FIG. 2
FIG. 3

METHOD FOR TRUNCATING SERVICE PERIOD, NETWORK CONTROLLER, AND STATION

This application is a continuation of International Application No. PCT/CN2014/084735, filed on Aug. 19, 2014, which claims priority to Chinese Patent Application No. 201310400350.2, filed on Sep. 5, 2013, both of which are hereby incorporated by reference in their entireties.

TECHNICAL FIELD

The present invention relates to the communications field, and more specifically, to a method for truncating a service period (Service Period, SP), a network controller, and a station (Station, STA).

BACKGROUND

60 GHz wireless communications belongs to a category of millimeter wave communications. A millimeter wave (Millimeter Wave) refers to an electromagnetic wave whose frequency ranges from 300 GHz to 30 GHz. A wavelength of the millimeter wave is from 1 mm to 10 mm, and therefore it is referred to as the millimeter wave. The millimeter wave has been widely applied in many fields, such as communications, radar, navigation, remote sensing, and radio astronomy. As an important branch of millimeter wave communications, 60 GHz communications mainly has advantages such as a large channel capacity, excellent directivity, high confidentiality, and favorable international versatility. A 60 GHz wireless communications technology can provide transmission at a multi-gigabit rate, and support high-definition video transmission, fast synchronization, a wireless USB, and a high speed wireless local area network.

In a 60 GHz wireless communications system, by using a directional multi-gigabit (DMG) Beacon frame or an Announce frame, a personal basic service set (PBSS) control point (PBSS Control Point, PCP) or an access point (AP) provides a PBSS or a basic service set (BSS) with basic timing and services of allocating channel access periods such as an SP and a contention-based access period (CBAP). As a network controller, the PCP or the AP needs to perform scheduling to avoid interference when allocating the SP and the CBAP in a data transfer interval (DTI). Because a directional transmission technology of beamforming is adopted, the 60 GHz communications standard 802.11ad allows different allocated SPs to overlap. Overlapping SPs may improve spatial sharing and spatial multiplexing in the BSS.

A STA may request the PCP or the AP to reserve an exclusive channel access period SP. Because of a dynamic feature of a variable rate of a streaming service, the SP may be surplus or insufficient, which can be resolved by adopting a method for dynamically truncating the SP or dynamically extending the SP respectively. To implement dynamic truncation of the SP, in the prior art, the PCP or the AP indicates, to the STA, whether the SP can be truncated, and if the SP can be truncated, the STA performs an operation of truncating the SP when the SP is surplus. Two manners are available for truncating the SP. In a first manner, the STA first releases remaining time of the SP to the PCP or the AP for subsequent dynamic allocation by the PCP or the AP; in a second manner, the STA directly releases the remaining time of the SP as a CBAP in a broadcasting manner.

However, in the prior art, the PCP or the AP only specifies whether the SP can be truncated, but a manner adopted to truncate the SP is actively determined by the STA, owner of the SP. Consequently, a problem may occur that interference is imposed on an adjacent STA when the STA actively releases the SP in a form of a CBAP.

SUMMARY

Embodiments of the present invention provide a method for truncating a service period, a network controller, and a station, which can reduce interference to communication after the SP is truncated.

According to a first aspect, a method for truncating a service period is provided, including: determining allocation control information of an SP, where the allocation control information includes a truncation indication and a truncation type indication, the truncation indication indicates whether the SP can be truncated, and the truncation type indication indicates a truncation type for truncating the SP; and sending the allocation control information to a STA, so that the STA uses the SP to perform communication, and truncates the SP according to the truncation type indicated by the truncation type indication when the SP is surplus and the truncation indication indicates that the SP can be truncated.

In a first possible implementation manner, the truncation type for truncating the SP includes a first truncation type or a second truncation type, where the first truncation type indicates a truncation type in which the STA returns remaining time of the SP to a network controller and the network controller allocates the remaining time of the SP, and the second truncation type indicates a truncation type in which the STA releases the remaining time of the SP as a CBAP.

With reference to the first possible implementation manner of the first aspect, in a second possible implementation manner, the determining allocation control information of an SP includes: determining the truncation indication and the truncation type indication, according to communication requests of STAs in a local BSS, interference information of communication between the STAs, and scheduling information of an adjacent BSS.

With reference to the first or the second possible implementation manner of the first aspect, in a third possible implementation manner, the determining allocation control information of an SP includes: if truncating the SP by the STA according to the second truncation type will impose interference on another STA, determining that the truncation indication indicates that the SP can be truncated and the truncation type indication indicates the first truncation type; or if that truncating the SP by the STA according to the second truncation type will not impose interference on another STA, determining that the truncation indication indicates that the SP can be truncated and the truncation type indication indicates the second truncation type.

With reference to the third possible implementation manner of the first aspect, in a fourth possible implementation manner, the allocation control information further includes an active indication, where the active indication indicates whether the network controller is active in the SP; and the determining allocation control information of an SP includes: if the truncation indication indicates that the SP can be truncated and the truncation type indication indicates the first truncation type, determining that the active indication indicates that the network controller is active in the SP; or if the truncation indication indicates that the SP can be truncated, the truncation type indication indicates the second truncation type, and the SP cannot be extended, determining that the active indication indicates that the network controller is inactive in the SP; or if the truncation indication indicates that the SP cannot be truncated, and the SP cannot be extended, determining that the active indication indicates that the network controller is inactive in the SP.

According to a second aspect, a method for truncating a service period is provided, including: receiving allocation control information that is of an SP and sent by a network controller, where the allocation control information includes a truncation indication and a truncation type indication, the truncation indication indicates whether the SP can be truncated, and the truncation type indication indicates a truncation type for truncating the SP; and using the SP to perform communication, and truncating the SP according to the truncation type indicated by the truncation type indication when the SP is surplus and the truncation indication indicates that the SP can be truncated.

In a first possible implementation manner, the truncation type for truncating the SP includes a first truncation type or a second truncation type, where the first truncation type indicates a truncation type in which the STA returns remaining time of the SP to the network controller and the network controller allocates the remaining time of the SP, and the second truncation type indicates a truncation type in which the STA releases the remaining time of the SP as a CBAP.

With reference to the first possible implementation manner of the second aspect, in a second possible implementation manner, the truncating the SP according to the truncation type indicated by the truncation type indication includes: if the truncation type indication indicates the first truncation type, returning the remaining time of the SP to the network controller, so that the network controller allocates the remaining time of the SP; or if the truncation type indication indicates the second truncation type, releasing the remaining time of the SP as the CBAP.

With reference to the second possible implementation manner of the second aspect, in a third possible implementation manner, the allocation control information further includes an active indication, where the active indication indicates whether the network controller is active in the SP, and before the returning the remaining time of the SP to the network controller, the method further includes: determining that the active indication indicates that the network controller is active in the SP.

According to a third aspect, a network controller is provided, including: a determining module, configured to determine allocation control information of an SP, where the allocation control information includes a truncation indication and a truncation type indication, the truncation indication indicates whether the SP can be truncated, and the truncation type indication indicates a truncation type for truncating the SP; and a sending module, configured to send the allocation control information to a STA, so that the STA uses the SP to perform communication, and truncates the SP according to the truncation type indicated by the truncation type indication when the SP is surplus and the truncation indication indicates that the SP can be truncated.

In a first possible implementation manner, the truncation type for truncating the SP includes a first truncation type or a second truncation type, where the first truncation type indicates a truncation type in which the STA returns remaining time of the SP to the network controller and the network controller allocates the remaining time of the SP, and the second truncation type indicates a truncation type in which the STA releases the remaining time of the SP as a CBAP.

With reference to the first possible implementation manner of the third aspect, in a second possible implementation manner, the determining module is specifically configured to: determine the truncation indication and the truncation type indication, according to communication requests of STAs in a local BSS, interference information of communication between the STAs, and scheduling information of an adjacent BSS.

With reference to the first or the second possible implementation manner of the third aspect, in a third possible implementation manner, the determining module is specifically configured to: if truncating the SP by the STA according to the second truncation type will impose interference on another STA, determine that the truncation indication indicates that the SP can be truncated and the truncation type indication indicates the first truncation type; or if truncating the SP by the STA according to the second truncation type will not impose interference on another STA, determine that the truncation indication indicates that the SP can be truncated and the truncation type indication indicates the second truncation type.

With reference to the third possible implementation manner of the third aspect, in a fourth possible implementation manner, the allocation control information further includes an active indication, where the active indication indicates whether the network controller is active in the SP; and the determining module is specifically configured to: if the truncation indication indicates that the SP can be truncated and the truncation type indication indicates the first truncation type, determine that the active indication indicates that the network controller is active in the SP; or if the truncation indication indicates that the SP can be truncated, the truncation type indication indicates the second truncation type, and the SP cannot be extended, determine that the active indication indicates that the network controller is inactive in the SP; or if the truncation indication indicates that the SP cannot be truncated, and the SP cannot be extended, determine that the active indication indicates that the network controller is inactive in the SP.

According to a fourth aspect, a STA is provided, including: a receiving module, configured to receive allocation control information that is of an SP and sent by a network controller, where the allocation control information includes a truncation indication and a truncation type indication, the truncation indication indicates whether the SP can be truncated, and the truncation type indication indicates a truncation type for truncating the SP; and a processing module, configured to use the SP to perform communication, and truncate the SP according to the truncation type indicated by the truncation type indication when the SP is surplus and the truncation indication indicates that the SP can be truncated.

In a first possible implementation manner, the truncation type for truncating the SP includes a first truncation type or a second truncation type, where the first truncation type indicates a truncation type in which the STA returns remaining time of the SP to the network controller and the network controller allocates the remaining time of the SP, and the second truncation type indicates a truncation type in which the STA releases the remaining time of the SP as a CBAP.

With reference to the first possible implementation manner of the fourth aspect, in a second possible implementation manner, the processing module is specifically configured to: if the truncation type indication indicates the first truncation type, return the remaining time of the SP to the network controller, so that the network controller allocates the remaining time of the SP; or if the truncation type indication indicates the second truncation type, release the remaining time of the SP as the CBAP.

With reference to the second possible implementation manner of the fourth aspect, in a third possible implementation manner, the allocation control information further includes an active indication, where the active indication indicates whether the network controller is active in the SP; and the processing module is further configured to: before the remaining time of the SP is returned to the network controller, determine that the active indication indicates that the network controller is active in the SP.

Based on the foregoing technical solutions, according to the embodiments of the present invention, allocation control information that is of an SP and includes a truncation type indication is sent to a STA, so that the STA truncates the SP according to a truncation type indicated by the truncation type indication, which can prevent the STA from actively releasing the SP as a CBAP and therefore reduce interference to communication after the SP is truncated.

BRIEF DESCRIPTION OF THE DRAWINGS

To describe the technical solutions in the embodiments of the present invention more clearly, the following briefly introduces the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

FIG. 1 is a schematic flowchart of a method for truncating a service period according to an embodiment of the present invention;

FIG. 2 is a schematic diagram of each access period in a BI;

FIG. 3 is a schematic diagram of a format of an allocation control field according to an embodiment of the present invention;

DETAILED DESCRIPTION OF ILLUSTRATIVE EMBODIMENTS

Figure 4:
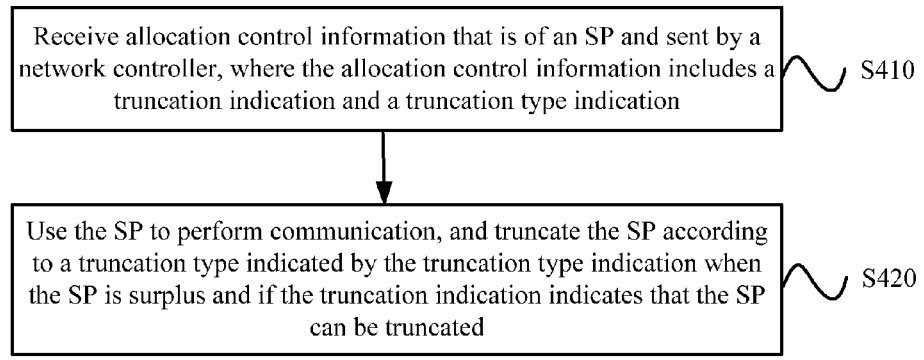
FIG. 4 is a schematic flowchart of a method for truncating a service period according to another embodiment of the present invention.

The following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

The technical solutions in the embodiments of the present invention can be applied to various wireless communications systems in which an SP is truncated, such as a 60 GHz wireless communications system.

In the embodiments of the present invention, a network controller may be a PCP or an AP. The PCP is a network controller in a PBSS and may be a STA; the AP is a network controller in a BSS. In the embodiments of the present invention, the PBSS established by the PCP and the BSS established by the AP are not distinguished, and are collectively referred to as a BSS.

FIG. 1 is a schematic flowchart of a method 100 for truncating a service period according to an embodiment of the present invention. The method in FIG. 1 is executed by a network controller. As shown in FIG. 1, the method 100 includes:

S110: Determine allocation control information of an SP, where the allocation control information includes a truncation indication and a truncation type indication, the truncation indication indicates whether the SP can be truncated, and the truncation type indication indicates a truncation type for truncating the SP.

S120: Send the allocation control information to a STA, so that the STA uses the SP to perform communication, and truncates the SP according to the truncation type indicated by the truncation type indication when the SP is surplus and the truncation indication indicates that the SP can be truncated.

If the network controller only indicates, to the STA, whether the SP can be truncated, interference may be imposed on an adjacent STA when the STA actively releases the SP in a form of a CBAP. To resolve this problem, in this embodiment of the present invention, the allocation control information that is of the SP and determined by the network controller not only includes the truncation indication, but also includes the truncation type indication, and the truncation type indication indicates a truncation type that is used by the STA to truncate the SP. Optionally, the truncation type for truncating the SP includes a first truncation type or a second truncation type, where the first truncation type indicates a truncation type in which the STA returns remaining time of the SP to the network controller and the network controller allocates the remaining time of the SP, and the second truncation type indicates a truncation type in which the STA releases the remaining time of the SP as a CBAP. In this way, when the SP is surplus, the STA truncates the SP according to the truncation type indicated by the truncation type indication, which can prevent interference being imposed on another STA when the STA actively releases the SP in the form of the CBAP.

Therefore, according to the method for truncating a service period in this embodiment of the present invention, the allocation control information that is of the SP and includes the truncation type indication is sent to the STA, so that the STA truncates the SP according to the truncation type indicated by the truncation type indication, which can prevent the STA from actively releasing the SP in the form of the CBAP and therefore reduce interference to communication after the SP is truncated.

In S110, the network controller determines the allocation control information of the SP, and the allocation control information includes the truncation indication and the truncation type indication.

The network controller allocates the SP to the STA by using the allocation control information of the SP. The allocation control information includes the truncation indication that indicates whether the SP can be truncated and the truncation type indication that indicates the truncation type for truncating the SP. The allocation control information may be an allocation control field in an Extended Schedule element; that is, the network controller may include the truncation indication and the truncation type indication in the allocation control field in the extended schedule information element.

Specifically, the network controller (a PCP or an AP) provides a BSS with basic timing and services of allocating channel access periods such as an SP and a CBAP by using a DMG Beacon frame or an Announce frame. Time of a DMG BSS is divided into beacon interval (BI) cycle, and each BI includes some channel access periods. FIG. 2 is a schematic diagram of each access period in a BI. A beacon transmission interval (BTI) is a period in which a DMG Beacon frame is transmitted. An association beamforming training (A-BFT) is a period of beamforming training that is performed when the PCP or the AP is associated with a STA that newly accesses a network. An announcement transmission interval (ATI) is a request/response-based polling management access period between a PCP or an AP and a STA. A data transfer interval (DTI) is a period in which data is transmitted. Scheduled by a PCP or an AP, the data transfer interval is divided into any combination of a CBAP and an SP, where the CBAP is a contention-based access period, and the SP is an exclusive reservation-based service period.

In the BTI or the ATI, the PCP or the AP allocates the DTI as any combination of the CBAP or the SP by sending the DMG Beacon frame or the Announce frame, where the DMG Beacon frame and the Announce frame both include the extended schedule information element. Each SP allocation is indicated by an allocation field in the extended schedule information element, and each allocation field includes a 2-byte allocation control field.

In this embodiment of the present invention, the network controller includes the truncation indication and the truncation type indication in the allocation control field in the extended schedule information element. For example, a format of the allocation control field that is shown in FIG. 3 can be adopted, where a meaning of each field is as follows:

Allocation type: defines a channel access mechanism type for allocation, including an SP type and a CBAP type.

Truncatable: a truncation indication, which indicates whether an SP can be truncated. For example, for an SP allocation, when this field is set to 1, a source STA and a destination STA can truncate an SP, and release remaining time of the SP; otherwise, this field is set to 0.

Extendable: indicates whether an SP can be extended. For example, for an SP allocation, when this field is set to 1, a source STA and a destination STA may request to extend an SP; otherwise, this field is set to 0.

Active: an active indication, which indicates whether a network controller is active. For example, when this field is set to 1, the network controller can receive and transmit data in a CBAP or an SP; otherwise, this field is set to 0. When the network controller is a PCP, the active indication is set; when the network controller is an AP, the active indication may not be set.

Truncation type: a truncation type indication, which indicates a truncation type for truncating an SP. Two truncation types are available. A first truncation type indicates a truncation type in which an STA returns remaining time of an SP to a network controller and the network controller allocates the remaining time of the SP. In this truncation type, the STA first releases the remaining time of the SP to the network controller, and then the network controller dynamically allocates the remaining time of the SP. A second truncation type indicates a truncation type in which an STA actively releases remaining time of an SP as a CBAP. In this truncation type, the STA actively releases the remaining time of the SP as the CBAP in a broadcasting manner without requiring participation of a network controller.

It should be understood that, in this embodiment of the present invention, the truncation type indication may indicate the foregoing two truncation types, or may indicate only one of the foregoing truncation types. For example, in an implementation manner in which two truncation types are indicated, 0 is used to indicate the first truncation type, and 1 is used to indicate the second truncation type; in an implementation manner in which only one truncation type is indicated, 0 is used to indicate that the second truncation type cannot be used, and 1 is used to indicate that the second truncation type can be used. The implementation manners and another equivalent variation should fall within the protection scope of the present invention.

It should be further understood that, in this embodiment of the present invention, the terms the "first" and the "second" are intended to merely distinguish between different content, and do not impose any limitation on this embodiment of the present invention.

When setting the truncation field to indicate that the SP can be truncated, the network controller also sets the truncation type field. For example, when the truncation field is set to 1 to indicate that the SP can be truncated, the truncation type field is set to 0 to indicate the first truncation type, or the truncation type field is set to 1 to indicate the second truncation type.

When the STA actively releases the SP in the form of the CBAP, interference may be imposed on an adjacent STA. Therefore, when determining the truncation type indication, the network controller needs to consider various possible interference cases, for example, interference to communication between other STAs that exist in the BSS in a spatial sharing manner, and scheduling information that is of a BSS of an adjacent cluster member and obtained by using an AP or PCP clustering mechanism.

Optionally, S110 includes determining the truncation indication and the truncation type indication according to communication requests of STAs in a local BSS, interference information of communication between the STAs, and scheduling information of an adjacent BSS.

Specifically, the network controller needs to determine the truncation indication and the truncation type indication in the allocation control information of the SP according to the communication requests of the STAs in the local BSS, the interference information of the communication between the STAs, and the scheduling information of the adjacent BSS.

In the ATI, the network controller can obtain the communication requests of the STAs in a polling manner. In addition, the network controller further has interference information of directional communication that the STAs perform by using beamforming. For example, before allocating multiple overlapping SPs to multiple STAs, the network controller instructs the STAs to measure a link and report interference information to the network controller. If the network controller is a cluster member, the network controller may obtain scheduling information of a BSS of an adjacent cluster member by receiving a DMG Beacon frame of another cluster member network controller.

To improve efficiency of spatial multiplexing, the network controller may allocate overlapping SPs to different STAs; however, new communication that is generated after one SP is truncated and released may impose interference on a STA that is communicating in another SP. Therefore, when setting the SP allocation control fields, the network controller needs to perform scheduling on the SPs and a CBAP according to the communication requests of the STAs and the information about interference between the STAs, which can prevent interference from being imposed on an adjacent STA when an SP is truncated and released. In addition, if the network controller is a member of a centralized cluster or a non-centralized cluster, the network controller may further obtain scheduling information of an adjacent BSS by using a DMG Beacon frame of another cluster member. According to scheduling information of all adjacent BSSs, the communication requests of the STAs, and the information about inference between the STAs, the network controller performs scheduling on the local BSS, and then determines and sets the truncation indication and the truncation type indication of each SP.

It should be understood that the network controller may determine the truncation indication and the truncation type indication according to only one or two of the communication requests of the STAs in the local BSS, the interference information of the communication between the STAs, and the scheduling information of the adjacent BSS. For example, the network controller may determine the truncation indication and the truncation type indication according to the communication requests of the STAs in the local BSS and the interference information of the communication between the STAs. These implementation manners also fall within the protection scope of the present invention.

Optionally, S110 includes: if truncating the SP by the STA according to the second truncation type will impose interference on another STA, determining that the truncation indication indicates that the SP can be truncated and the truncation type indication indicates the first truncation type. Alternatively, if truncating the SP by the STA according to the second truncation type will not impose interference on another STA, determining that the truncation indication indicates that the SP can be truncated and the truncation type indication indicates the second truncation type.

When determining that the SP can be truncated, the network controller needs to simultaneously determine the truncation type. If releasing the remaining time of the SP in the manner of the CBAP will impose interference on the another STA, the network controller determines that the truncation type indication indicates the first truncation type; if releasing the remaining time of the SP in the manner of the CBAP will not impose interference on the another STA, the network controller determines that the truncation type indication indicates the second truncation type.

For example, an SP1 and an SP2 that are allocated by the network controller overlap, a source STA and a destination STA that are of the SP1 are respectively a STA1 and a STA2, and a source STA and a destination STA that are of the SP2 are respectively a STA3 and a STA4. When a directional transmission technology is adopted, communication between the STA1 and the STA2 does not impose interference on the STA3 and STA4. Because the SP1 and the SP2 overlap, to prevent imposing inference on the SP2 after the SP1 is truncated, the network controller can set a truncation field in an allocation control field of the SP1 to 0 to indicate that the SP1 cannot be truncated; or the network controller can set a truncation field in an allocation control field of the SP1 to 1 to indicate that the SP1 can be truncated, and set a truncation type field to 0 to indicate the first truncation type. However, the network controller cannot set the truncation field and the truncation type field that are in the allocation control field of the SP1 to 1 and 1 respectively (the truncation type field being set to 1 indicates the second truncation type) for the following reason: If the truncation field and the truncation type field are set to 1 and 1 respectively, access to a channel by another STA in the manner of the CBAP after the SP1 is truncated may impose interference on the SP2. Further, if the network controller detects that both a STA5 and a STA6 have a channel access request, and directional communication between the STA5 and the STA6 will not impose interference on communication between the STA3 and the STA4 in the SP2, the truncation field and the truncation type field that are in the allocation control field of the SP1 may be set to 1 and 0 respectively. In this case, if the STA1 and the STA 2 truncate and release remaining time of the SP1 according to the first truncation type, the network controller may dynamically allocate the remaining time of the SP1 to the STA5 and the STA6.

If the SP1 allocated by the network controller does not overlap with an SP of any BSS, the network controller can set the truncation field and the truncation type field that are in the allocation control field of the SP1 to 1 and 1 respectively. The STA1 releases the remaining time of the SP1 as the CBAP, and other STAs can contend for an access channel within the released CBAP without generating interference to each other.

In this embodiment of the present invention, when the allocation control information further includes an active indication, the network controller also needs to determine the active indication.

Optionally, S110 includes if the truncation indication indicates that the SP can be truncated and the truncation type indication indicates the first truncation type, determining that the active indication indicates that the network controller is active in the SP. Alternatively, if the truncation indication indicates that the SP can be truncated, the truncation type indication indicates the second truncation type, and the SP cannot be extended, determining that the active indication indicates that the network controller is inactive in the SP. Alternatively, if the truncation indication indicates that the SP cannot be truncated, and the SP cannot be extended, determining that the active indication indicates that the network controller is inactive in the SP.

The active indication indicates whether the network controller is active in the SP. When the network controller is active, it indicates that the network controller can receive and transmit data in a corresponding access period; when the network controller is inactive, it indicates that the network controller cannot receive or transmit data in the corresponding access period. When being inactive, the network controller can go to sleep to save power consumption. Therefore, to save power consumption, whether the network controller is active or not is improved in this embodiment of the present invention.

Specifically, when the SP can be extended, the network controller is active. However, a rule for setting the extendable field is: The network controller may set an extendable field of a current SP to 1 (indicating that the SP is extendable) only when an access period immediately after the current SP is still an SP, and the SP is an SP used for dynamical allocation by the network controller in the DTI. This case rarely occurs. That is, in most cases, the SP cannot be extended. When the SP cannot be extended, whether the SP can be truncated and the truncation type are main factors that determine whether the PCP can hibernate in the SP.

When the SP can be truncated and the truncation type indication indicates the first truncation type, because truncating the SP according to the first truncation type requires that the network controller receive and transmit data, the network controller is active. In this case, the active indication is set to indicate that the network controller is active.

When the SP can be truncated and the truncation type indication indicates the second truncation type, truncating the SP according to the second truncation type does not require that the network controller receive and transmit data. Therefore, when the SP cannot be extended either, the network controller may be inactive. In this case, the active indication is set to indicate that the network controller is inactive. Therefore, the network controller can sleep within the entire SP, which saves power consumption. When the network controller is a PCP that is powered by a battery, saving power consumption can prolong time of power supply.

For example, if the SP1 allocated by the network controller does not overlap with an SP of any BSS, the network controller can set the truncation field and the truncation type field that are in the allocation control field of the SP1 to 1 and 1 respectively, and set an active field to 0 (indicating that the network controller is inactive). The STA1 releases the remaining time of the SP1 as the CBAP, and other STAs can contend for an access channel within the released CBAP without generating interference to each other. In addition, because the STA1 actively completes truncation and release of the SP1, the network controller can sleep within the entire SP1 to save power consumption.

When the SP cannot be truncated or extended, the network controller may be inactive. In this case, the active indication is set to indicate that the network controller is inactive. Likewise, the network controller can sleep within the entire SP, which saves power consumption.

In S120, the network controller sends the allocation control information to the STA, so that the STA uses the SP to perform communication, and truncates the SP according to the truncation type indicated by the truncation type indication when the SP is surplus and the truncation indication indicates that the SP can be truncated.

Specifically, the network controller sends the allocation control information that is of the SP and determined in S110 to the STA. The STA uses the SP to perform communication, and truncates the SP according to the truncation type indicated by the truncation type indication when the SP is surplus and if the truncation indication indicates that the SP can be truncated.

When the truncation type indication indicates the first truncation type, the STA returns the remaining time of the SP to the network controller, and the network controller allocates the remaining time of the SP. Specifically, the STA sends a contention free-end (CF-End) frame to the network controller, and returns the remaining time of the SP to the network controller; then the network controller performs re-allocation in a dynamic allocation manner.

When the truncation type indication indicates the second truncation type, the STA releases the remaining time of the SP as the CBAP. Specifically, the STA actively truncates and releases the SP, and configures a channel access type for the remaining time of the SP as the CBAP. For that, the STA broadcasts a Grant frame. Both a source association ID (AID) and a destination AID of the Grant frame are set to broadcast AIDs, and an allocation type field is set to the CBAP.

According to the method for truncating a service period in this embodiment of the present invention, allocation control information of an SP including a truncation type indication is sent to a STA, so that the STA can truncate the SP according to a truncation type indicated by the truncation type indication, which can prevent the STA from actively releasing remaining time of the SP in a CBAP manner and therefore reduce interference to communication after the SP is truncated. In addition, when determining that the truncation type indication indicates that the STA releases the remaining time of the SP in the CBAP manner, the network controller is inactive, which increases a chance for the network controller to sleep and therefore saves power consumption.

The foregoing has described the method for truncating a service period in this embodiment of the present invention in detail from a perspective of the network controller, and the following describes a method for truncating a service period in an embodiment of the present invention from a perspective of a STA.

FIG. 4 is a schematic flowchart of a method 400 for truncating a service period according to an embodiment of the present invention. The method in FIG. 4 is executed by a STA. As shown in FIG. 4, the method 400 includes:

S410. Receive allocation control information that is of an SP and sent by a network controller, where the allocation control information includes a truncation indication and a truncation type indication, the truncation indication indicates whether the SP can be truncated, and the truncation type indication indicates a truncation type for truncating the SP.

S420. Use the SP to perform communication, and truncate the SP according to the truncation type indicated by the truncation type indication when the SP is surplus and if the truncation indication indicates that the SP can be truncated.

In this embodiment of the present invention, the allocation control information that is of the SP and sent by the network controller to the STA not only includes the truncation indication, but also includes the truncation type indication, and the truncation type indication indicates a truncation type that is used by the STA to truncate the SP. Optionally, the truncation type for truncating the SP includes a first truncation type or a second truncation type, where the first truncation type indicates a truncation type in which the STA returns remaining time of the SP to the network controller and the network controller allocates the remaining time of the SP, and the second truncation type indicates a truncation type in which the STA releases the remaining time of the SP as a CBAP. In this way, when the SP is surplus, the STA truncates the SP according to the truncation type indicated by the truncation type indication, which can prevent interference being imposed on another STA when the STA actively releases the SP in the form of the CBAP.

Therefore, according to the method for truncating a service period in this embodiment of the present invention, the SP is truncated according to the truncation type indicated by the truncation type indication included in the allocation control information of the SP, which can prevent the STA from actively releasing the SP in the form of the CBAP and therefore reduce interference to communication after the SP is truncated.

In this embodiment of the present invention, the allocation control information may be an allocation control field in an extended schedule information element; that is, the network controller may include the truncation indication and the truncation type indication in the allocation control field in the extended schedule information element. The allocation control field may adopt the format shown in FIG. 3.

In this embodiment of the present invention, optionally, S420 includes if the truncation type indication indicates the first truncation type, returning remaining time of the SP to the network controller, so that the network controller allocates the remaining time of the SP. Alternatively, if the truncation type indication indicates the second truncation type, releasing remaining time of the SP as the CBAP.

When the truncation type indication indicates the first truncation type, the STA releases the remaining time of the SP to the network controller, and the network controller allocates the remaining time of the SP. Specifically, the STA sends a CF-End frame to the network controller, and returns the remaining time of the SP to the network controller; then the network controller performs re-allocation in a dynamic allocation manner.

When the truncation type indication indicates the second truncation type, the STA releases the remaining time of the SP as the CBAP in a broadcasting manner. Specifically, the STA actively truncates and releases the SP, and configures a channel access type for the remaining time of the SP as the CBAP. For that, the STA broadcasts a Grant (Grant) frame. A source association ID and a destination AID that are of the Grant frame are both set to broadcast AIDs, and an allocation type field is set to the CBAP.

In this embodiment of the present invention, optionally, the allocation control information further includes an active indication, where the active indication indicates whether the network controller is active in the SP. Before the returning remaining time of the SP to the network controller, the method 400 further includes determining that the active indication indicates that the network controller is active in the SP.

Specifically, when the network controller is active, it indicates that the network controller can receive and transmit data in a corresponding access period; when the network controller is inactive, it indicates that the network controller cannot receive or transmit data in the corresponding access period. To save power consumption, when being inactive, the network controller can go to sleep. Therefore, in the allocation control information of the SP, the network controller includes the active indication to indicate to STAs whether the network controller is active. Because truncating the SP according to the first truncation type requires that the network controller transmit and receive data, in this case, the network controller sets the active indication to indicate that network controller is active. When truncating the SP, the STA first determines that the active indication indicates that the network controller is active in the SP, and then returns the remaining time of the SP to the network controller; the network controller allocates the remaining time of the SP. However, because truncating the SP according to the second truncation type does not require that the network controller receive or transmit data, when the SP cannot be extended, the network controller sets the active indication to indicate that network controller is inactive. In this case, the STA actively releases the remaining time of the SP as the CBAP in the broadcasting manner, and the network controller can sleep within the entire SP, which saves power consumption.

It should be understood that, in this embodiment of the present invention, interaction between a network controller and a STA and related features and functions of the network controller that are described from a perspective of the network controller are corresponding to those of the STA that are described from a perspective of the STA. For brevity, details are not described herein again.

It should be understood that sequence numbers of the foregoing processes do not mean execution sequences in various embodiments of the present invention. The execution sequences of the processes should be determined according to functions and internal logic of the processes, and should not be construed as any limitation on the implementation processes of the embodiments of the present invention.

The foregoing has described, with reference to FIG. 1 to FIG. 4, the methods for truncating a service period in detail according to the embodiments of the present invention. The following describes, with reference to FIG. 5 to FIG. 8, in detail a network controller and a STA according to the embodiments of the present invention.

Figure 5:
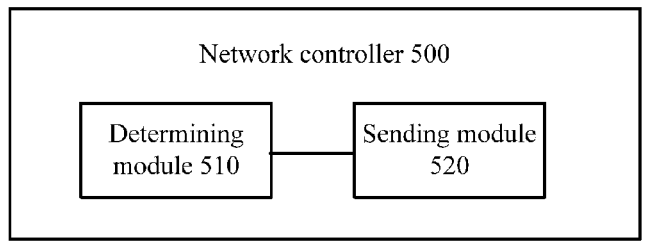
FIG. 5 is a schematic block diagram of a network controller according to an embodiment of the present invention.

FIG. 5 is a schematic block diagram of a network controller 500 according to an embodiment of the present invention. As shown in FIG. 5, the network controller 500 includes a determining module 510 is configured to determine allocation control information of an SP. The allocation control information includes a truncation indication and a truncation type indication, the truncation indication indicates whether the SP can be truncated, and the truncation type indication indicates a truncation type for truncating the SP. A sending module 520 is configured to send the allocation control information to a STA, so that the STA uses the SP to perform communication, and truncates the SP according to the truncation type indicated by the truncation type indication when the SP is surplus and the truncation indication indicates that the SP can be truncated.

In this embodiment of the present invention, the allocation control information that is of the SP and determined by the determining module 510 of the network controller 500 not only includes the truncation indication, but also includes the truncation type indication, and the truncation type indication indicates a truncation type that is used by the STA to truncate the SP. Optionally, the truncation type for truncating the SP includes a first truncation type or a second truncation type, where the first truncation type indicates a truncation type in which the STA returns remaining time of the SP to the network controller and the network controller allocates the remaining time of the SP, and the second truncation type indicates a truncation type in which the STA releases the remaining time of the SP as a CBAP. Therefore, when the SP is surplus, the STA truncates the SP according to the truncation type indicated by the truncation type indication, which can prevent interference being imposed on another STA when the STA actively releases the SP in the form of the CBAP.

Therefore, the network controller in this embodiment of the present invention sends to the STA the allocation control information of the SP including the truncation type indication, so that the STA truncates the SP according to the truncation type indicated by the truncation type indication, which can prevent the STA from actively releasing the SP in the form of the CBAP and therefore reduce interference to communication after the SP is truncated.

In this embodiment of the present invention, the allocation control information may be an allocation control field in an extended schedule information element; that is, the network controller 500 may include the truncation indication and the truncation type indication in the allocation control field in the extended schedule information element. The allocation control field may adopt the format shown in FIG. 3.

Because actively release of the SP in the form of the CBAP by the STA may impose interference on an adjacent STA, when determining the truncation type indication, the network controller needs to take all interference information into consideration.

In this embodiment of the present invention, optionally, the determining module 510 is specifically configured to: determine the truncation indication and the truncation type indication according to communication requests of STAs in a local BSS, interference information of communication between the STAs, and scheduling information of an adjacent BSS.

In this embodiment of the present invention, optionally, the determining module 510 is specifically configured to: if truncating the SP by the STA according to the second truncation type will impose interference on another STA, determine that the truncation indication indicates that the SP can be truncated and the truncation type indication indicates the first truncation type; or if truncating the SP by the STA according to the second truncation type will not impose interference on another STA, determine that the truncation indication indicates that the SP can be truncated and the truncation type indication indicates the second truncation type.

In this embodiment of the present invention, optionally, the allocation control information further includes an active indication, where the active indication indicates whether the network controller is active in the SP. The determining module 510 is specifically configured to: if the truncation indication indicates that the SP can be truncated and the truncation type indication indicates the first truncation type, determine that the active indication indicates that the network controller is active in the SP; or if the truncation indication indicates that the SP can be truncated, the truncation type indication indicates the second truncation type, and the SP cannot be extended, determine that the active indication indicates that the network controller is inactive in the SP; or if the truncation indication indicates that the SP cannot be truncated, and the SP cannot be extended, determine that the active indication indicates that the network controller is inactive in the SP.

The network controller 500 in this embodiment of the present invention may be corresponding to the network controller in the method 100 for truncating a service period according to the embodiment of the present invention. In addition, each module in the network controller 500 performs the foregoing and other operations and/or functions to implement the corresponding processes of the methods shown in FIG. 1 to FIG. 4. For brevity, details are not described herein again.

The network controller according to the embodiment of the present invention sends allocation control information of an SP including a truncation type indication to a STA, so that the STA can truncate the SP according to a truncation type indicated by the truncation type indication, which can prevent the STA from actively releasing the SP in a form of a CBAP and therefore reduce interference to communication after the SP is truncated. In addition, when it is determined that the truncation type indication indicates a truncation type in which the STA releases remaining time of the SP as the CBAP, the network controller is inactive, which increases a chance for the network controller to sleep and therefore saves power consumption.

Figure 6:
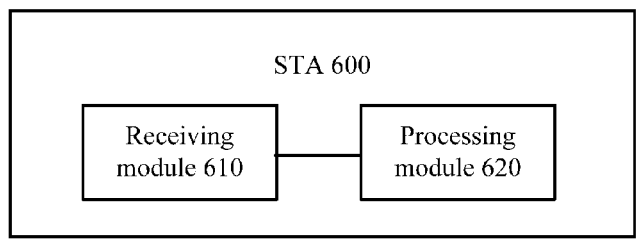
FIG. 6 is a schematic block diagram of a STA according to an embodiment of the present invention.

FIG. 6 is a schematic block diagram of a STA 600 according to an embodiment of the present invention. As shown in FIG. 6, the STA 600 includes a receiving module 610, configured to receive allocation control information that is of an SP and sent by a network controller, where the allocation control information includes a truncation indication and a truncation type indication, the truncation indication indicates whether the SP can be truncated, and the truncation type indication indicates a truncation type for truncating the SP. A processing module 620 is configured to use the SP to perform communication, and truncate the SP according to the truncation type indicated by the truncation type indication when the SP is surplus and if the truncation indication indicates that the SP can be truncated.

According to the STA in this embodiment of the present invention, the SP is truncated according to the truncation type indicated by the truncation type indication included in the allocation control information of the SP, which can prevent the STA from actively releasing the SP in a form of a CBAP and therefore reduce interference to communication after the SP is truncated.

Optionally, the truncation type for truncating the SP includes a first truncation type or a second truncation type, where the first truncation type indicates a truncation type in which the STA returns remaining time of the SP to the network controller and the network controller allocates the remaining time of the SP, and the second truncation type indicates a truncation type in which the STA releases the remaining time of the SP as the CBAP.

In this embodiment of the present invention, the allocation control information may be an allocation control field in an extended schedule information element; that is, the network controller may include the truncation indication and the truncation type indication in the allocation control field in the extended schedule information element. The allocation control field may adopt the format shown in FIG. 3.

In this embodiment of the present invention, optionally, the processing module 620 is specifically configured to: if the truncation type indication indicates the first truncation type, return the remaining time of the SP to the network controller, so that the network controller allocates the remaining time of the SP; or if the truncation type indication indicates the second truncation type, release the remaining time of the SP as the CBAP.

In this embodiment of the present invention, optionally, the allocation control information further includes an active indication, where the active indication indicates whether the network controller is active in the SP. The processing module 620 is further configured to: before the returning the remaining time of the SP to the network controller, determine that the active indication indicates that the network controller is active in the SP.

The STA 600 in this embodiment of the present invention may be corresponding to the STA in the method 400 for truncating a service period in the embodiment of the present invention. In addition, each module in the STA 600 performs the foregoing and other operations and/or functions to implement the corresponding processes of the methods shown in FIG. 1 to FIG. 4. For brevity, details are not described herein again.

Figure 7:
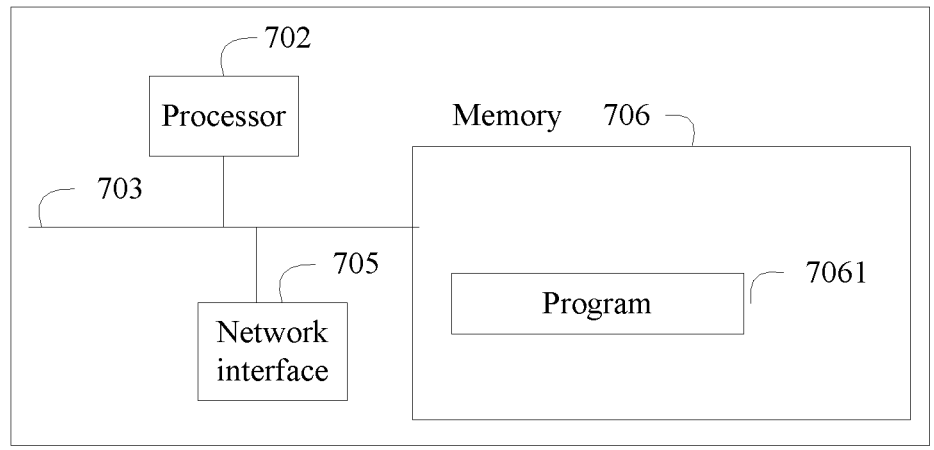
FIG. 7 is a schematic diagram of a structure of a network controller according to an embodiment of the present invention.

FIG. 7 is a schematic diagram of a structure of a network controller according to another embodiment of the present invention. The network controller includes at least one processor 702 (for example, a CPU), at least one network interface 705 or at least one communications interface of another type, a memory 706, and at least one communications bus 703 that is configured to implement connection and communication between these apparatuses. The processor 702 is configured to execute an executable module stored in the memory 706, for example, a computer program. The memory 706 may include a high-speed random access memory (RAM), and may further include a non-volatile memory, for example, at least one magnetic disk memory. The connection to and communication with at least one other network element is implemented by using the at least one network interface 705 (may be wired or wireless).

In some implementation manners, the memory 706 stores a program 7061, where the program 7061 may be executed by the processor 702. This program includes determining allocation control information of an SP, where the allocation control information includes a truncation indication and a truncation type indication, the truncation indication indicates whether the SP can be truncated, and the truncation type indication indicates a truncation type for truncating the SP. The program further includes sending the allocation control information to a STA, so that the STA uses the SP to perform communication, and truncates the SP according to the truncation type indicated by the truncation type indication when the SP is surplus and the truncation indication indicates that the SP can be truncated.

Optionally, the truncation type for truncating the SP includes a first truncation type or a second truncation type, where the first truncation type indicates a truncation type in which the STA returns remaining time of the SP to the network controller and the network controller allocates the remaining time of the SP, and the second truncation type indicates a truncation type in which the STA releases the remaining time of the SP as a contention-based access period CBAP.

Optionally, the determining allocation control information of an SP includes determining the truncation indication and the truncation type indication according to communication requests of STAs in a local basic service set BSS, interference information of communication between the STAs, and scheduling information of an adjacent BSS.

Optionally, the determining allocation control information of an SP includes if truncating the SP by the STA according to the second truncation type will impose interference on another STA, determining that the truncation indication indicates that the SP can be truncated and the truncation type indication indicates the first truncation type. Alternatively, if truncating the SP by the STA according to the second truncation type will not impose interference on another STA, determining that the truncation indication indicates that the SP can be truncated and the truncation type indication indicates the second truncation type.

Optionally, the allocation control information further includes an active indication, where the active indication indicates whether the network controller is active in the SP. The determining allocation control information of an SP includes if the truncation indication indicates that the SP can be truncated and the truncation type indication indicates the first truncation type, determining that the active indication indicates that the network controller is active in the SP. Alternatively, if the truncation indication indicates that the SP can be truncated, the truncation type indication indicates the second truncation type, and the SP cannot be extended, determining that the active indication indicates that the network controller is inactive in the SP. Alternatively, if the truncation indication indicates that the SP cannot be truncated, and the SP cannot be extended, determining that the active indication indicates that the network controller is inactive in the SP.

It can be learned from the foregoing technical solution in this embodiment of the present invention that, according to the embodiment of the present invention, allocation control information of an SP including a truncation type indication is sent to a STA, so that the STA truncates the SP according to a truncation type indicated by the truncation type indication, which can prevent the STA from actively releasing the SP in a form of a CBAP and therefore reduce interference to communication after the SP is truncated.

Figure 8:
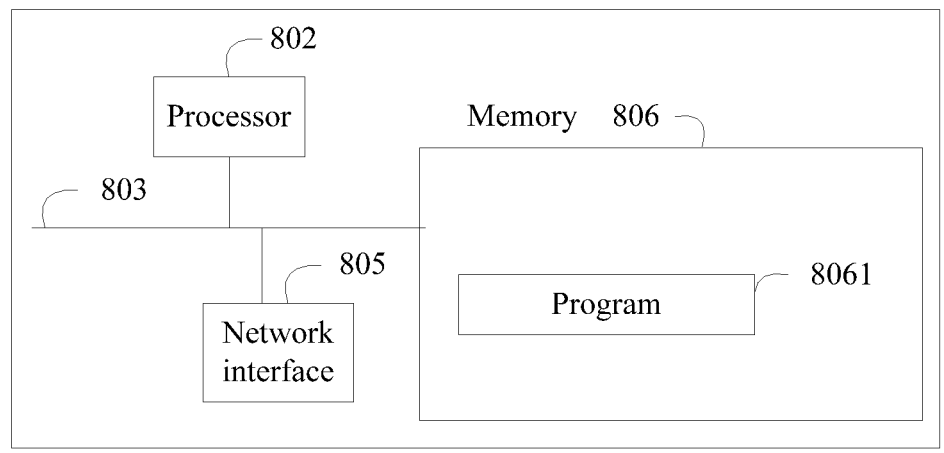
FIG. 8 is a schematic diagram of a structure of a STA according to an embodiment of the present invention.

FIG. 8 is a schematic diagram of a structure of a STA according to another embodiment of the present invention. The STA includes at least one processor 802 (for example, a CPU), at least one network interface 805 or at least one communications interface of another type, a memory 806, and at least one communications bus 803 that is configured to implement connection and communication between these apparatuses. The processor 802 is configured to execute an executable module stored in the memory 806, for example, a computer program. The memory 806 may include a high-speed random access memory (RAM), and may further include a non-volatile memory, for example, at least one magnetic disk memory. The connection to and communication with at least one other network element is implemented by using the at least one network interface 805 (may be wired or wireless).

In some implementation manners, the memory 806 stores a program 8061, where the program 8061 may be executed by the processor 802. This program includes receiving allocation control information that is of an SP and sent by a network controller, where the allocation control information includes a truncation indication and a truncation type indication, the truncation indication indicates whether the SP can be truncated, and the truncation type indication indicates a truncation type for truncating the SP. Using the SP to perform communication, and truncating the SP according to the truncation type indicated by the truncation type indication when the SP is surplus and if the truncation indication indicates that the SP can be truncated.

Optionally, the truncation type for truncating the SP includes a first truncation type or a second truncation type, where the first truncation type indicates a truncation type in which the STA returns remaining time of the SP to the network controller and the network controller allocates the remaining time of the SP, and the second truncation type indicates a truncation type in which the STA releases the remaining time of the SP as a contention-based access period CBAP.

Optionally, the truncating the SP according to the truncation type indicated by the truncation type indication includes if the truncation type indication indicates the first truncation type, returning the remaining time of the SP to the network controller, so that the network controller allocates the remaining time of the SP. Alternatively, if the truncation type indication indicates the second truncation type, releasing the remaining time of the SP as the CBAP.

Optionally, the allocation control information further includes an active indication, where the active indication indicates whether the network controller is active in the SP. Before the returning the remaining time of the SP to the network controller, the operations further includes determining that the active indication indicates that the network controller is active in the SP.

It can be learned from the technical solutions provided in the embodiments of the present invention that, according to the embodiment of the present invention, an SP is truncated according to a truncation type indicated by a truncation type indication included in allocation control information of the SP, which can prevent the STA from actively releasing the SP in a form of a CBAP and therefore reduce interference to communication after the SP is truncated.

It should be understood that, the term "and/or" in this embodiment of the present invention describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

A person of ordinary skill in the art may be aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments of the present invention.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or a part of the technical solutions may be implemented in the form of a software product. The software product is stored in a storage medium and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific embodiments of the present invention, but are not intended to limit the protection scope of the present invention. Any modification or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for truncating a service period, the method comprising:
   determining and generating, by a network controller, allocation control information of the service period, wherein the allocation control information comprises a truncation indication and a truncation type indication, the truncation indication indicates whether the service period can be truncated, and the truncation type indication indicates a truncation type for truncating the service period; and
   sending, by the network controller, the allocation control information to a station,
   wherein, determining the allocation control information of the service period comprises:
   determining the truncation indication at least according to communication requests of stations in a local basic service set (BSS); and determining the truncation type indication at least according to interference information of communication between the stations, and scheduling information of an adjacent BSS.

2. The method according to claim 1, wherein the truncation type for truncating the service period comprises a first truncation type or a second truncation type, wherein the first truncation type indicates a truncation type in which the station returns remaining time of the service period to a network controller and the network controller allocates the remaining time of the service period, and the second truncation type indicates a truncation type in which the station releases the remaining time of the service period as a contention-based access period (CBAP).

3. The method according to claim 2, wherein determining the allocation control information of the service period comprises:
   if it is determined that the service period can be truncated and truncating the service period by the station according to the second truncation type will impose interference on another station, determining that the truncation indication indicates that the service period can be truncated and the truncation type indication indicates the first truncation type; or
   if it is determined that the service period can be truncated and truncating the service period by the station according to the second truncation type will not impose interference on another station, determining that the truncation indication indicates that the service period can be truncated and the truncation type indication indicates the second truncation type.

4. The method according to claim 3, wherein the allocation control information further comprises an active indication, and the active indication indicates whether the network controller is active in the service period; and
   wherein determining the allocation control information of the service period comprises:
   if the truncation indication indicates that the service period can be truncated and the truncation type indication indicates the first truncation type, determining that the active indication indicates that the network controller is active in the service period; or
   if the truncation indication indicates that the service period can be truncated, the truncation type indication indicates the second truncation type, and the service period cannot be extended, determining that the active indication indicates that the network controller is inactive in the service period; or if the truncation indication indicates that the service period cannot be truncated, and the service period cannot be extended, determining that the active indication indicates that the network controller is inactive in the service period.

5. A method for truncating a service period, the method comprising:

receiving allocation control information of the service period and sent by a network controller, wherein the allocation control information comprises a truncation indication and a truncation type indication, wherein the truncation indication indicates whether the service period can be truncated, and wherein the truncation type indication indicates a truncation type for truncating the service period, wherein the truncation indication is determined at least according to communication requests of stations in a local basic service set (BSS), and wherein the truncation type indication is determined at least according to interference information of communication between the stations, and scheduling information of an adjacent BSS; and using the service period to perform communication, and truncating the service period according to the truncation type indicated by the truncation type indication when the service period is surplus and if the truncation indication indicates that the service period can be truncated.

6. The method according to claim 5, wherein the truncation type for truncating the service period comprises a first truncation type or a second truncation type, the first truncation type indicates a truncation type in which a station returns remaining time of the service period to the network controller and the network controller allocates the remaining time of the service period, and the second truncation type indicates a truncation type in which the station releases the remaining time of the service period as a contention-based access period (CBAP).

7. The method according to claim 6, wherein the truncating the service period according to the truncation type indicated by the truncation type indication comprises:

if the truncation type indication indicates the first truncation type, returning the remaining time of the service period to the network controller, so that the network controller allocates the remaining time of the service period; or if the truncation type indication indicates the second truncation type, releasing the remaining time of the service period as the CBAP.

8. The method according to claim 7, wherein the allocation control information further comprises an active indication, and the active indication indicates whether the network controller is active in the service period; and before the returning the remaining time of the service period to the network controller, the method further comprises:

determining that the active indication indicates that the network controller is active in the service period.

9. A network controller comprising:

a processor;

a memory comprising a program executable on the processor, the program comprising instructions for determining and generating allocation control information of a service period, wherein the allocation control information comprises a truncation indication and a truncation type indication, the truncation indication indicates whether the service period can be truncated, and the truncation type indication indicates a truncation type for truncating the service period; and a transmitter configured to send the allocation control information to a station, wherein the program comprises further instructions for determining the truncation indication at least according to communication requests of stations in a local basic service set (BSS), and determining the truncation type indication at least according to interference information of communication between the stations, and scheduling information of an adjacent BSS.

10. The network controller according to claim 9, wherein the truncation type for truncating the service period comprises a first truncation type or a second truncation type, the first truncation type indicates a truncation type in which the station returns remaining time of the service period to the network controller and the network controller allocates the remaining time of the service period, and the second truncation type indicates a truncation type in which the station releases the remaining time of the service period as a contention-based access period (CBAP).

11. The network controller according to claim 10, wherein the program comprises further instructions for:

if it is determined that the service period can be truncated and truncating the service period by the station according to the second truncation type will impose interference on another station, determining that the truncation indication indicates that the service period can be truncated and the truncation type indication indicates the first truncation type; or if it is determined that the service period can be truncated and truncating the service period by the station according to the second truncation type will not impose interference on another station, determining that the truncation indication indicates that the service period can be truncated and the truncation type indication indicates the second truncation type.

12. The network controller according to claim 11, wherein the allocation control information further comprises an active indication, and the active indication indicates whether the network controller is active in the service period; and the program comprises further instructions for:

if the truncation indication indicates that the service period can be truncated and the truncation type indication indicates the first truncation type, determining that the active indication indicates that the network controller is active in the service period; or if the truncation indication indicates that the service period can be truncated, the truncation type indication indicates the second truncation type, and the service period cannot be extended, determining that the active indication indicates that the network controller is inactive in the service period; or if the truncation indication indicates that the service period cannot be truncated, and the service period cannot be extended, determining that the active indication indicates that the network controller is inactive in the service period.

13. A station comprising:

a receiver configured to receive allocation control information that is of a service period service period and sent by a network controller, wherein the allocation control information comprises a truncation indication and a truncation type indication, the truncation indication indicates whether the service period can be truncated, and the truncation type indication indicates a truncation type for truncating the service period, wherein the truncation indication is determined at least according to communication requests of stations in a local basic service set (BSS), and wherein the truncation type indication is determined at least according to interference information of communication between the stations, and scheduling information of an adjacent BSS;

a processor; and a memory comprising a program to be executed in the processor, the program comprising instructions for using the service period to perform communication, and truncating the service period according to the truncation type indicated by the truncation type indication when the service period is surplus and if the truncation indication indicates that the service period can be truncated.

14. The station according to claim 13, wherein the truncation type for truncating the service period comprises a first truncation type or a second truncation type, the first truncation type indicates a truncation type in which the station returns remaining time of the service period to the network controller and the network controller allocates the remaining time of the service period, and the second truncation type indicates a truncation type in which the station releases the remaining time of the service period as a contention-based access period CBAP.

15. The station according to claim 14, wherein the program comprises further instructions for:

if the truncation type indication indicates the first truncation type, returning the remaining time of the service period to the network controller, so that the network controller allocates the remaining time of the service period; or if the truncation type indication indicates the second truncation type, releasing the remaining time of the service period as the CBAP.

16. The station according to claim 15, wherein the allocation control information further comprises an active indication, and the active indication indicates whether the network controller is active in the service period; and the program comprises further instructions for: before the remaining time of the service period is returned to the network controller, determining that the active indication indicates that the network controller is active in the service period.

* * * * *